United States Patent
Tuev et al.

(10) Patent No.: US 8,656,893 B2
(45) Date of Patent: Feb. 25, 2014

(54) LIQUID HYDROCARBON FUEL TREATING DEVICE FOR AN INTERNAL COMBUSTION ENGINE

(75) Inventors: Sergei Vladimirovich Tuev, St. Petersburg (RU); Viktor Mihailovich Mamchenko, Lennigradskaya (RU); Aleksei Valer'evich Bagryancev, Sankt-Petersburg (RU)

(73) Assignee: EKOM USA, Marblehead, OH (US)

( * ) Notice: Subject to any disclaimer, the term of this patent is extended or adjusted under 35 U.S.C. 154(b) by 692 days.

(21) Appl. No.: 12/527,060

(22) PCT Filed: Jan. 22, 2008

(86) PCT No.: PCT/RU2008/000029
§ 371 (c)(1),
(2), (4) Date: Jan. 24, 2011

(87) PCT Pub. No.: WO2008/100178
PCT Pub. Date: Aug. 21, 2008

(65) Prior Publication Data
US 2011/0114065 A1    May 19, 2011

(30) Foreign Application Priority Data
Feb. 13, 2007    (RU) ................. 2007105949

(51) Int. Cl.
*F02M 27/00*    (2006.01)
(52) U.S. Cl.
USPC ........................................ 123/538; 123/557
(58) Field of Classification Search
CPC ............................. F02M 27/04; C10G 32/02
USPC ......... 123/538, 543, 549, 554, 557, 558, 536, 123/565; 44/280, 409, 411; 429/408, 425; 210/243; 204/554, 559, 565
See application file for complete search history.

(56) References Cited

U.S. PATENT DOCUMENTS

| | | | |
|---|---|---|---|
| 1,376,180 A * | 4/1921 | Wickersham | 204/170 |
| 3,761,062 A * | 9/1973 | King | 261/1 |
| 3,976,726 A | 8/1976 | Johnson | |

(Continued)

FOREIGN PATENT DOCUMENTS

| | | |
|---|---|---|
| DE | 10040158 | 7/2002 |
| GB | 2058908 | 4/1981 |

(Continued)

OTHER PUBLICATIONS

International Searching Authority, International Search Report and Written Opinion for PCT/RU2008/000029, Oct. 20, 2009, 6 pages.

*Primary Examiner* — Hung Q Nguyen
(74) *Attorney, Agent, or Firm* — Standley Law Group LLP

(57) ABSTRACT

A device for treating liquid carbonous fuel having external and internal electrodes having a dielectric insert positioned between and coaxially arranged to form a treatment chamber. The chamber is connected to a fuel line by an outlet channel located along the longitudinal axis of the electrodes and at least one inlet channel disposed in the external electrode, wherein the inlet and outlet channels are embodied according to a relationship (1), wherein $S_{iin}$ is the cross-section area of an i-th inlet channel, n is the number of inlet channels and $S_{out}$ is the cross-section area of the outlet channel.

$$\sum_{i=1}^{n} S_{iin} = (0.1/2.7) S_{out} \quad (1)$$

17 Claims, 1 Drawing Sheet

(56) References Cited

U.S. PATENT DOCUMENTS 4,373,494 A * 2/1983 McMahon .................... 123/538
2010/0024783 A1 * 2/2010 Tao et al. ..................... 123/538

FOREIGN PATENT DOCUMENTS

| RU | 43040 | 12/2004 |
| SU | 1590608 | 7/1990 |

* cited by examiner

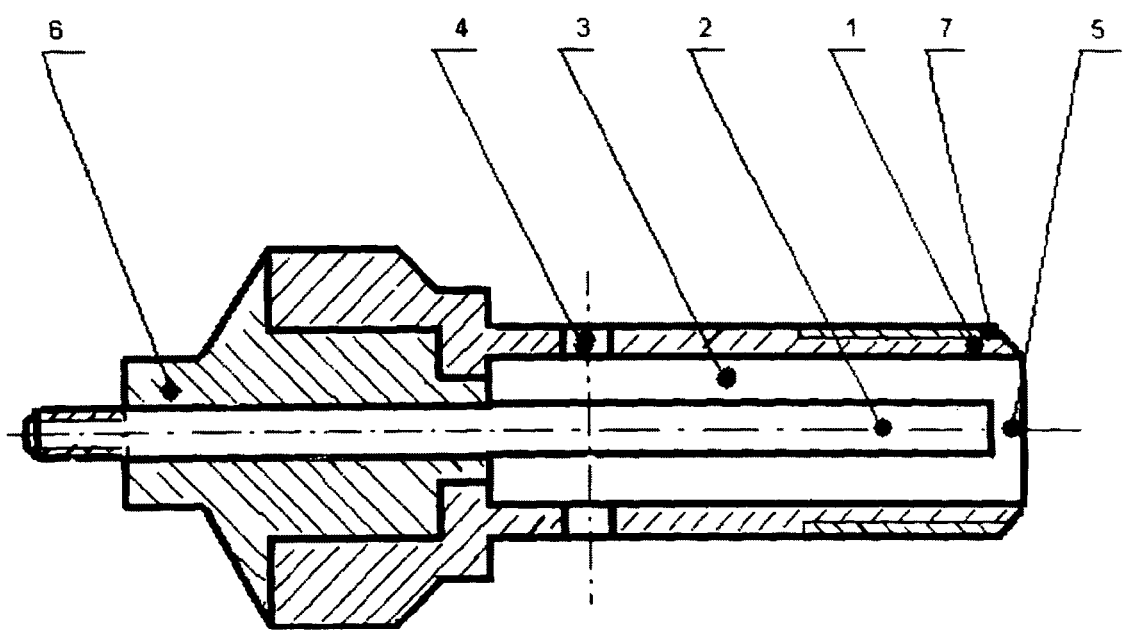

LIQUID HYDROCARBON FUEL TREATING DEVICE FOR AN INTERNAL COMBUSTION ENGINE

THE FIELD OF APPLICATION

The invention is one of the devices for processing the liquid carbon fuel and can be used in different production processes for reprocessing a liquid of hydrocarbon fuel and for preparing it for the combustion in different power systems, including internal combustion engines.

The Previous Level of Technology

The closest to the declared invention in the technical essence and the attainable result is a device for processing the hydrocarbon fuel of the diesel engine, which contains electrodes, external and internal, arranged coaxially in such a way that a fuel processing chamber is formed there between and is connected to a fuel line by means of the inlet channel and the outlet channel; the outlet channel being located along the longitudinal axis of the electrodes, a dielectric insert placed between the electrodes, wherein the external electrode is embodied in the form of a bolt which is fixable to the fuel line body by means of an external thread, the inlet channel is embodied in the form of one open-end hole connecting the bolt external surface, which is located between the bolt head and the end face thereof opposite to the head of the bolt, wherein a cross-sectional area the inlet channel of $S_{in}$ satisfies the relation $$S_{in} = (0.54/0.81) S_{out}$$

wherein $S_{out}$ is the cross-sectional area of the inlet channel. (see patent for the useful model RU 43040, class F 02 M 27/04, 27 Dec. 2004).

Drawbacks of the said device for processing the hydrocarbon fuel of the diesel engine are:
 the complexity of the production of the inlet and the outlet channels, since it is necessary to observe the range of the ratio of their areas, which ensure the efficiency of processing fuel, it is necessary to consider not only cross-sectional area of each of the channels, but also their length;
 the impossibility of the application in the engines with a power of up to 350 hp since assigned ratio of the inlet and the outlet channels $S_{in}=(0.54\ 10.81)\ S_{out}$ do not ensure the supply of the necessary volume of fuel into the cavity of the fuel processing chamber in the engines of larger power, which accordingly leads to the power loss of the engine.

THE DISCLOSURE OF INVENTION

The technical result of the invention is the creation of a new device for processing the liquid hydrocarbon fuel of internal combustion engine, which ensures a simplicity of the production and an increase of the efficiency of processing fuel.

The technical result is achieved by the creation a Liquid Hydrocarbon Device for fuel processing for an internal combustion engine, comprises the external and the internal electrodes which are coaxially arranged in such a way that the fuel processing chamber is formed there between and is connected to a fuel line by means of the inlet channel and the outlet channel, the outlet channel being located along the longitudinal axis of the electrodes, a dielectric insert placed between the electrodes, wherein the external electrode is embodied in the form of a bolt which is fixable to the fuel line body by means of an external thread, the inlet channel is embodied in the form of at least one hole connecting the external surface of the bolt, which is located between the bolt head and the end face thereof opposite to the head, to the fuel processing chamber and the internal electrode is extended beyond the end face of the bolt head through a dielectric sleeve, where according to an invention the inlet and the outlet channels are embodied according to a ratio $$\sum_{i=1}^{n} S_{iin} = (0.1/2.7) S_{out}$$

wherein $S_{iin}$ is the cross-section area of an i-th inlet channel, n is the number of the inlet channels and $S_{out}$, is the cross-section area of the inlet channel.

In such device for the processing the liquid hydrocarbon fuel of the internal combustion engine embodying of the inlet and the outlet channels of their cross-section area according to a ratio $$\sum_{i=1}^{n} S_{iin} = (0.1/2.7) S_{out}$$

ensure the simplicity in the production and increase of the efficiency in processing fuel.

The simplicity in the production is ensured by three sufficiently simple determined parameters:

$S_{iin}$ is the cross-section area of the inlet channel; n is the number of the inlet channels; S out is the cross-section area of the outlet channel. The specific ratio of cross-section areas of the inlet and the outlet channels are assigned depending on the power of the engine.

An increase of the efficiency of the processing fuel is provided by the possibility of the recovery of the unburned fuel, which is about 75% of the total volume of the processed fuel, from the engine through the inlet channel of the device into its fuel processing chamber, what substantially increases the degree of ionization of fuel, and, therefore, the value of its heat of combustion. The possibility of the recovery of the unburned fuel directly into the fuel processing chamber by the said device is achieved by an increase of the total cross-section area of the inlet channels, which in turn makes it possible for the usage of the device in the engines with a power of 350 hp.

In the known devices of fuel processing, including the prototype, taking into account their constructional possibilities the unburned fuel returns back to the fuel tank by the auxiliary fuel pipe. As the fuel returns back to the fuel tank (about 6-8 meters) the degree of ionizations of the fuel substantially is reduced and during the secondary entry of the fuel into the fuel processing chamber an additional consumption power for the achievement of necessary degree of ionization.

The comparative characteristics of the standard diesel fuel and the fuel, processed with the use of a prototype and the declared device, they are given in the table.

The Comparison Characteristics of the Base Fuel and
The Fuel processed by the Prototype and by the Declared Device.

| | | Processed Diesel Fuel | |
|---|---|---|---|
| Fuel Characteristics | The Standard Diesel Fuel, GOST 1667-78 | Usage of the Prototype | Usage of the Declared Device |
| Kinematic Viscosity, mm/s | 5 | 4.85 | 3.93 |

-continued

The Comparison Characteristics of the Base Fuel and
The Fuel processed by the Prototype and by the Declared Device.

|  | The Standard Diesel Fuel, GOST 1667-78 | Processed Diesel Fuel | |
|---|---|---|---|
| Fuel Characteristics | | Usage of the Prototype | Usage of the Declared Device |
| Density, gr/sm$^2$ | 0.93 | 0.88 | 0.62 |
| Temperature of Ignition, ° C. | 88 | 79.2 | 65.4 |
| Minimum specific combustion heat for engines of power up to 350 hp, kJ/kg | 42633 | 45930 | 47460 |
| Change of combustion heat with respect to the base fuel (up to 350 hp), kJ/kg | — | 3297 7.7% | 4827 11.3% |
| Change of combustion heat of the fuel when processed by the present device with reration to the prototype (up to 350 hp), kJ/kg |  |  | 1530 46.4% |
| Minimum special combustion heat for engines of power more than 350 hp kJ/kg | 42633 | 43912 | 47460 |
| Change of combustion heat with relation to the base fuel (more than 350 hp), kJ/kg | — | 1279 3.0% | 4827 11.3% |
| Change of combustion heat of the fuel when processed by the present device with relation to the prototype (more than 350 hp), kJ/kg |  |  | 3548 277.4% |

As can be seen from the given table, after processing fuel with using of the prototype or the declared device the main fuel efficiency index—the heat of combustion—is higher than in the base fuels, not processed. However, during the fuel processing for the engines with a power of up to 350 hp with the declared device the heat of combustion of the fuel is higher than 1530KJ/kg in the prototype what in the percent ratio is s 46.4%.

The considerable increase in the efficiency in fuel processing is reached by the declared device in a comparison with the prototype for the engines with a power of more than 350 hp. Where the index of the heat of combustion of fuel is higher than 3548KJ/kg than in the prototype what in the percent ratio is 277.4%.

The above-indicated advantages profitably distinguish the declared invention from the prototype.

THE BRIEF DESCRIPTION OF DRAWINGS

The declared invention is represented on FIG. 1, where the overview of the Liquid Hydrocarbon Fuel Processing Device for an internal combustion engine is shown in cut.

BEST EXECUTION OF THE INVENTION

The Liquid Hydrocarbon Fuel Processing Device for an internal combustion engine, comprises the internal 2 and the external 1 electrodes which are coaxially arranged in such a way that the fuel processing chamber 3 is formed there between and is connected to a fuel line by means of the inlet channel 4 and the outlet 5 channel, (not shown on the figure) the outlet channel 5 being located along the longitudinal axis of the electrodes 1, 2, a dielectric insert 6 placed between the electrodes 1, 2, wherein the external electrode 1 is embodied in the form of a bolt which is fixable to the fuel line body by means of an external thread 7, the inlet channel 4 is embodied in the form of at least one hole connecting to the external surface of the bolt, which is located between the bolt head and the end face thereof opposite to the head, to the fuel processing chamber 3 and the internal electrode 2 is extended beyond the end face of the bolt head through a dielectric sleeve 6, where according to an invention the inlet and outlet channels are embodied according to a ratio:

$$\sum_{i=1}^{n} S_{iin} = (0.1/2.7) S_{out}$$

The Liquid Hydrocarbon Fuel Processing Device for an internal combustion engine works in the following way.

The Liquid hydrocarbon fuel goes through the inlet channel 4 enters the fuel processing chamber 3, situated between the internal 2 and the external 1 electrode. An electric current is applied to the internal 2 and the external 1 electrodes with the voltage in the range of 12/200V depending on the type of fuel at the frequency picked from range 0.5-6.0 kHz.

During this fragmentation of hydrocarbons of fuel into smaller clusters is achieved, i.e., of the smaller mass and volume. Further, the fuel follows into the fuel line and the fuel processing chamber of combustion engine via the outlet channel 5.

With the combustion of the processed fuel is ensured its larger burnout with the isolation of a larger quantity of energy and the decrease of the toxicity of the exhaust gases.

INDUSTRIAL APPLICABILITY

The usage of the declared device for processing the liquid hydrocarbon fuel the internal combustion engines makes it possible to obtain the positive effect, which is manifested by the creation of a new device for the combustion, which ensures the simplicity in the production and an increase of the efficiency of processing fuel.

Formula of The Invention

The Liquid Hydrocarbon Fuel Processing Device for an internal combustion engine, comprises the external and internal electrodes which are coaxially arranged in such a way that the fuel processing chamber formed there between and is connected to a fuel line by means of the inlet channel and the outlet channel; the outlet channel is located along the longitudinal axis of the electrodes, a dielectric insert placed between the electrodes, wherein the external electrode is embodied in the form of a bolt which is fixable to the fuel line body by means of an external thread; the inlet channel is embodied in the form of at least one hole connecting to the external surface of the bolt, which is located between the bolt head and the end face thereof opposite to the head, to the fuel processing chamber and the internal electrode is extended beyond the end face of the bolt head through a dielectric sleeve, where according to an invention the inlet and the outlet channels are embodied according to a ratio $$\sum_{i=1}^{n} S_{iin} = (0.1/2.7) S_{out}$$

wherein $S_{iin}$ is the cross-section area of an i-th inlet channel, n is the number of the inlet channels and $S_{out}$ is the cross-section area of the inlet channel.

The invention claimed is:

1. An apparatus for processing Liquid Hydrocarbon Fuel for an internal combustion engine, comprising:
    a first electrode;
    a second electrode where said second electrode is positioned about said first electrode such that a chamber is formed between the first electrode and second electrode and where said second electrode comprises an inlet channel and an outlet channel; and
    a dielectric insert positioned between the first electrode and second electrode,
    wherein the inlet and outlet channels are embodied according to the formula $$\sum_{i=1}^{n} S_{iin} = (0.1/2.7)S_{out}$$

wherein $S_{iin}$ is the cross-section area of an i-th inlet channel, n is the number of the inlet channels and $S_{out}$ is the cross-section area of the outlet channel.

2. The apparatus of claim 1 where said second electrode comprises threading.

3. The apparatus of claim 2 where said threading is configured to fix said second electrode to a fuel line.

4. The apparatus of claim 1 where said dielectric insert electrically isolates the first and second electrodes from each other.

5. The apparatus of claim 1 where said first electrode and said second electrode are coaxially arranged on a longitudinal axis and where said outlet channel is located on the longitudinal axis of the electrodes.

6. The apparatus of claim 5 where the inlet channel is defined by the second electrode.

7. The apparatus of claim 1 where the inlet and outlet channels are adapted to connect the second electrode to a fuel line of the internal combustion engine.

8. The apparatus of claim 1 where said second electrode is configured as a bolt.

9. The apparatus of claim 1 where the electrodes comprise a conductive material.

10. The apparatus of claim 1 where said chamber is a fuel treatment chamber.

11. The apparatus of claim 1 comprising at least two inlet channels.

12. A method for processing a liquid hydrocarbon fuel in an internal combustion engine, comprising the steps of:
    providing a fuel line of the internal combustion engine with an apparatus of claim 1;
    passing the fuel through the apparatus from the inlet channel to the outlet channel while supplying the first and second electrodes with an electric current, resulting in a treated fuel; and
    combusting the treated fuel in the internal combustion engine.

13. The method of claim 12 where said electric current has a voltage of 12V-2 kV and an oscillating frequency from 0.5 to 6.0 kHz.

14. The method of claim 12 wherein the inlet and outlet channels of the apparatus are sized such that a ratio of the sum of the cross-sectional areas of all of the inlet channels to the sum of the cross-sectional areas of all of the outlet channels is about 1:27.

15. An apparatus for processing liquid hydrocarbon fuel, comprising:
    a processing chamber defined as a region between a first and second electrode, the first and second electrodes arranged coaxially on a longitudinal axis, each having a first end and a second end, wherein the first end of the second electrode affixes said second electrode to a fuel line body;
    at least one inlet channel disposed in the second electrode to permit liquid hydrocarbon fluid to enter the processing chamber;
    an outlet channel positioned along the longitudinal axis of the first and second electrodes at the first ends of the electrodes, said outlet channel adapted to allow liquid carbon fluid to exit the processing chamber;
    a dielectric insert interposed between the first and second electrodes at the second end of the electrodes, said first electrode extending through the dielectric insert;
    wherein the at least one inlet channel and said outlet channel are embodied according to the ratio $$\sum_{i=1}^{n} Siin = (0.1/2.7)S_{out},$$

wherein $S_{inn}$ is the cross-section area of an i-th inlet channel, n is the number of inlet channels and $S_{out}$ is the cross-sectional area of the outlet channel.

16. The apparatus of claim 15, wherein the second electrode is affixed to the fuel line body by external threads.

17. The apparatus of claim 15, wherein the processing chamber is a fuel treatment chamber.

* * * * *